United States Patent [19]

Iacoponi et al.

[11] Patent Number: 4,499,410

[45] Date of Patent: Feb. 12, 1985

[54] DEVICE FOR AUTOMATICALLY ADJUSTING THE FREQUENCY OF ACTIVATION OF A MOTOR VEHICLE WINDSCREEN WIPER

[75] Inventors: Stefano Iacoponi; Vittorio Di Nunzio, both of Turin, Italy

[73] Assignee: Fiat Auto Spa., Turin, Italy

[21] Appl. No.: 505,300

[22] Filed: Jun. 17, 1983

[30] Foreign Application Priority Data

Jun. 22, 1982 [IT] Italy ................ 67793 A/82

[51] Int. Cl.³ .............................................. H02P 1/04
[52] U.S. Cl. .............................. 318/444; 318/DIG. 2; 318/483; 15/250 C
[58] Field of Search ................. 318/443, 444, DIG. 2, 318/483; 15/250 C

[56] References Cited

U.S. PATENT DOCUMENTS 4,317,073 2/1982 Blaszkowski ........................ 318/483

FOREIGN PATENT DOCUMENTS 2465618 4/1981 France ................................ 318/443
0156738 12/1980 Japan ................................... 318/443

OTHER PUBLICATIONS

Electronics Australia, Sep. 1979, vol. 41, No. 6, pp. 68–73.

Primary Examiner—J. V. Truhe
Assistant Examiner—Bentsu Ro
Attorney, Agent, or Firm—Gifford, VanOphem, Sheridan, Sprinkle & Nabozny

[57] ABSTRACT

A device for automatic adjustment of the frequency of activation of a motor vehicle windscreen wiper driven by a motor is described. The main characteristic of the device lies in the fact that it comprises circuit means which control the frequency of activation as a function of the quantity of water present on the surface which is wiped by the windscreen wiper.

12 Claims, 7 Drawing Figures

DEVICE FOR AUTOMATICALLY ADJUSTING THE FREQUENCY OF ACTIVATION OF A MOTOR VEHICLE WINDSCREEN WIPER

BACKGROUND OF THE INVENTION

The present invention relates to a device for automatically adjusting the frequency of activation of a motor vehicle windscreen wiper which is driven by a motor.

As is known, windscreen wipers both for the front windscreen and for the rear window are driven by motors which are activated by the driver by means of a control switch when its operation is considered necessary. The continuous operation of the windscreen wiper is not necessary, however, in certain meteorological conditions characterised by intermittent drizzle or dampness, fog, sleet, etc. In fact it is irritating for the driver so that on some cars there has been also provided a slow speed functioning of the windscreen wiper, which the user can employ in the above described visibility conditions. There have also been provided devices for controlling intermittent operation of the windscreen wiper at a fixed frequency; even this, however, is sometimes not satisfactory; either it seems to be too infrequent (the visibility deteriorates excessively during the delay time), or else too frequent (visibility remains good during the delay time, so that the operation of the windscreen wiper seems more troublesome than useful, especially if the surface of the glass being almost dry causes the characteristic squeaking of the blades).

SUMMARY OF THE INVENTION

The object of the present invention is that of providing a device for automatically adjusting the frequency of activation of a motor vehicle windscreen wiper which satisfies the driver's control requirements particularly in the presence of variable meteorological conditions characterised by short and intermittent showers of rain, or else in very damp or foggy conditions when a layer of very fine droplets tends to form on the windscreen or on the rear window, whereby to adapt the operation to the real visibility conditions through the windscreen or the rear window in such a way as to overcome the above indicated disadvantages and thereby improve the driver's comfort.

According to the present invention there is provided a device for automatically adjusting the frequency of activation of a motor vehicle windscreen wiper driven by a motor, characterised by the fact that it includes circuit means which control the said frequency of activation as a function of the quantity of water present on the surface wiped by the said windscreen wipers.

BRIEF DESCRIPTION OF THE DRAWINGS

For a better understanding of the present invention one embodiment will now be described, by way of non-limitative example, with reference to the attached drawings, in which.

DETAILED DESCRIPTION OF THE INVENTION

Figure 1:
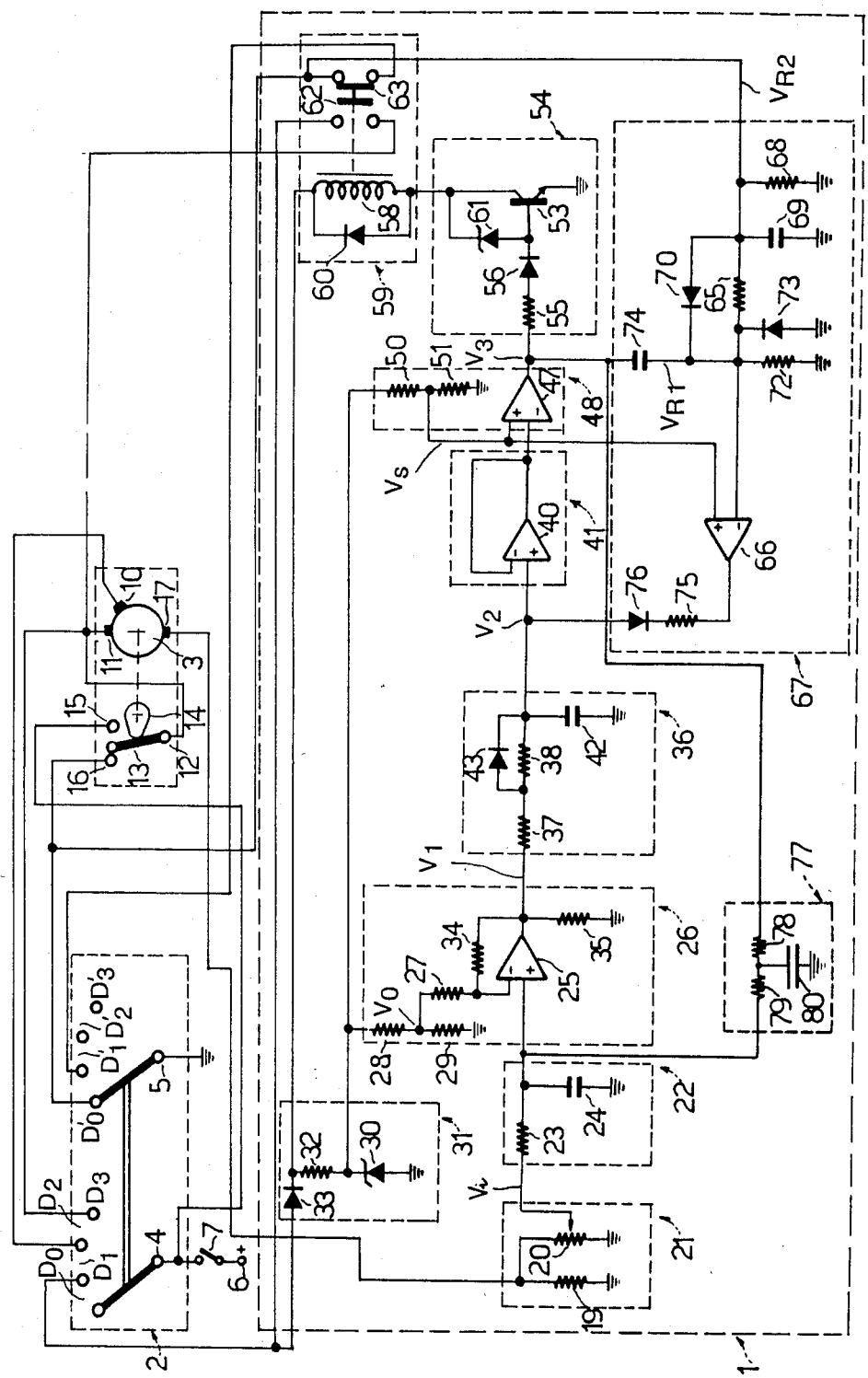
FIG. 1 is a schematic diagram of the device of the present invention applied to the activation of a windscreen wiper motor.

With reference to FIG. 1 there is shown a schematic diagram of the device of the present invention, indicated with the reference numeral 1, within the region delimited by the large broken line rectangle, which is connected to a double switch 2 of known type which controls a known dc motor 3 for actuation of the windscreen wipers. The double switch 2 has two fixed contacts, respectively 4 and 5, which are connected, respectively, to a positive voltage supply terminal 6, by means of a switch 7 operated by the ignition key of the vehicle, and to ground. This double switch 2 has two sets of four changeover contacts, respectively indicated with the symbols $D_0$, $D_1$, $D_2$, $D_3$ and $D_0'$, $D_1'$, $D_2'$, $D_3'$. The position of the contacts with the subscript zero corresponds to the condition of de-energization of the motor 3, whilst the contacts indicated with the subscripts 2 and 3 are those relating to the continuous operation of the motor 3 at slow speed and at normal speed respectively. The connections with these contacts having subscripts 0, 2 and 3 are therefore those already provided in known devices. In particular, the contact $D_0$ is not connected; the contact $D_2$ is connected to an input terminal 10 of the motor 3; the contact $D_3$ is connected to an input terminal 11 of the motor 3 and also to a common terminal 12 of a known switch 13 controlled by a cam 14 driven by the shaft of the motor 3 which in this way normally determines the contact of the switch 13 with a contact 15, whilst over a limited angle, for example 30°, about the rest position of the windscreen wiper, it determines connection with a contact 16. The contact 15 is connected to the fixed contact 4 of the double switch 2 and the contact 16 is connected to the contact $D_0'$. The contacts $D_2'$ and $D_3'$ are free. According to the device of the present invention, the output terminal 17 of the motor 3, instead of being connected directly to ground, is connected through a resistor 19 which, as will be described in more detail below, serves to provide a signal indicative of the armature current in the motor 3. This resistor 19 is of low value to limit the dissipation of heat, but still sufficient to provide a significant voltage signal with respect to the voltage drops inevitably present on the grounded closure contact of the motor 3. Preferably, the resistor 19 has a value sufficient to provide a voltage signal of several hundred millivolts. In parallel with the resistor 19 there is connected a variable resistor 20 which allows a calibration of the device, that is to say of the signal taken off, to be effected as a function of the type of installation (dimensions of the windscreen, type and number of blades, etc.). The resistors 19 and 20 therefore constitute a unit 21, indicated in broken outline, which detects the motor current which is proportional to the quantity of water present on the surface wiped by the windscreen wiper, as will be described in more detail below. Unit 21 provides a proportional signal $V_i$ which is sent to a filter circuit 22 which comprises a series resistor 23 and a grounded capacitor 24. The connection between the resistor 23 and the capacitor 24 constitutes the output of the filter circuit 22 which is connected to the non-inverting input of a differential amplifier 25 belonging to an amplifier unit 26 which provides at its output a voltage signal $V_1$ proportional to the armature current of the motor 3. One terminal of a resistor 27 is connected to the inverting input of the differential amplifier 25. The other terminal of the resistor 27 is connected between resistors 28 and 29. The resistors 28 and 29 are connected in series, with one end connected to ground and the other end connected to the cathode of a Zener diode 30 which is part of a voltage stabilizer unit 31. The anode of this Zener diode 30 is grounded, whilst its cathode is connected to a resistor 32, the other end of which is connected to the cathode of a diode 33, which is a diode for protection against polarity reversal in the connections, and the anode of which is connected to the contact $D_1$ of the double switch 2. Between the output of the differential amplifier 25 and its inverting input there is connected a resistor 34, whilst a resistor 35 is connected between the output of the amplifier 25 and ground. The voltage signal between the resistors 28 and 29 is therefore a constant voltage signal $V_0$, and the amplifier unit 26 thus provides a output signal $V_1$ equal to $K(V_i - V_0)$ where K is the amplification constant determined by the value of the resistors in the unit 26. The voltage signal $V_1$ is passed to an integrator circuit 36 having different time constants with respect to increasing and decreasing input signals, in particular having a smaller time constant for increasing signals and comprising, in particular, the series connection of two resistors 37 and 38 the latter of which is connected to the non-inverting input of a buffer amplifier 40 belonging to a unit 41 forming a emitter follower amplifier circuit, and to ground via a capacitor 42. A diode 43 is connected in parallel with the resistor 38 and its cathode is connected to the output of the integrator circuit 36 at which a signal $V_2$ appears. The output of the buffer amplifier 40 is connected both to the inverting input of the buffer amplifier 40 itself and to the inverting input of a differential amplifier 47 of a comparator unit 48. The non-inverting input of the differential amplifier 47 is connected to the connection between two series resistors 50 and 51 which provide a voltage signal $V_s$, and which are connected between the cathode of the Zener diode 30 and ground. The output of the differential amplifier 47 is connected to the base of a transistor 53 of a power control unit 54 through a resistor 55 and a diode 56 connected in series, the cathode of the diode being connected to the base of the transistor 53. The emitter of the transistor 53, which is of NPN type, is connected to ground, whilst its collector is connected to the cathode of the diode 33 and to a control winding 58 of a relay 59 for control of the motor 3. In parallel with the winding 58 there is connected a diode 60 the anode of which is connected to the collector of the transistor 53, to which latter there is also connected the cathode of a Zener diode 61 the anode of which is connected to the base of the transistor 53 and which constitutes a protection element for the transistor 53 against overloading from the supply side. The winding 58 controls a first, normally open, switch 62 connected between the input terminal 11 of the motor 3 and the contact $D_1$ of the double switch 2, and further controls a second, normally closed, switch 63, connected between the contact $D_1'$ of the double switch 2 and the contact 16 of the switch 13. This contact 16, at which appears a voltage signal $V_{R2}$, is also connected via a resistor 65 to the inverting input of a differential amplifier 66 of a zeroing unit 67 for the integrator circuit 36. The input of the resistor 65 is also grounded through the parallel connection of a resistor 68 and a capacitor 69, and is also connected to the anode of a diode 70 connected in parallel with the resistor 65. The inverting input of the amplifier 66 is also grounded through a resistor 72, and is connected to the cathode of a diode 73 the anode of which is grounded. The output of the differential amplifier 47 of the comparator unit 48 is connected to the inverting input of the differential amplifier 66 through a capacitor 74. The connection between the resistors 50 and 51, as well as being connected to the non-inverting input of the differential amplifier 47, is also connected to the non-inverting input of the differential amplifier 66 the output of which is connected via a resistor 75 to the cathode of a diode 76 the anode of which is connected to the non-inverting input of the buffer amplifier 40.

The output of the differential amplifier 47 of the unit 48 is connected to a filtering unit 77. The unit 77 comprises a resistor 78, connected to ground through a capacitor 80 and to a resistor 79. The output of unit 77 is connected to the non-inverting input of the amplifier 25. The unit 77 is designed to provide an initial system interrupt if continuous operation persists for an extended period of time.

Figure 2:
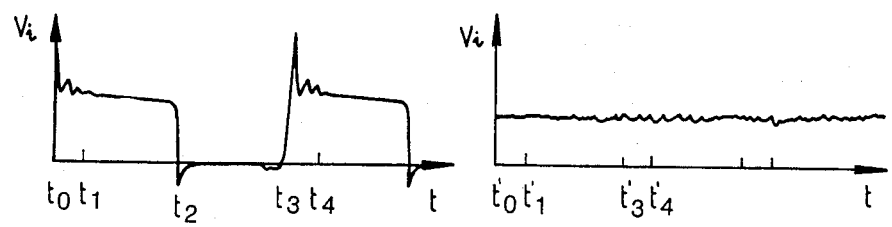
FIG. 2 is an illustration of different signals present at various points in the diagram of FIG. 1, in two different operating conditions.
Figure 2:
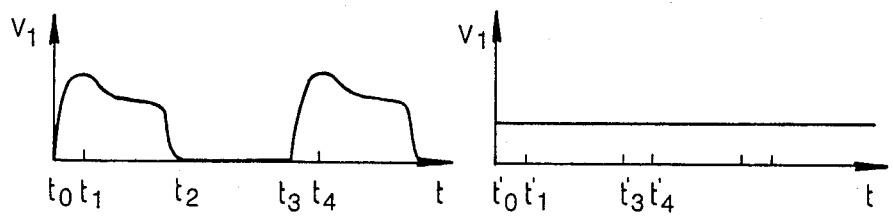
Figure 2:
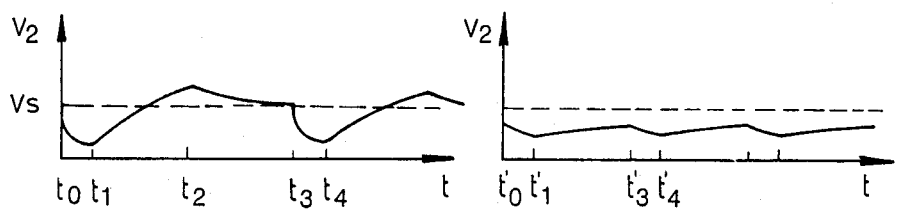
Figure 2:
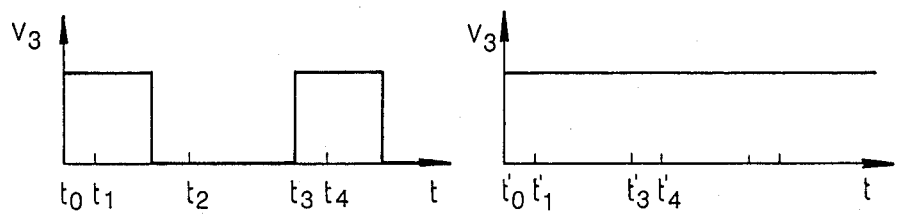
Figure 2:
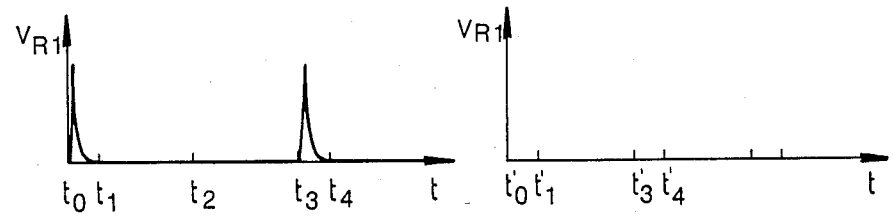
Figure 2:
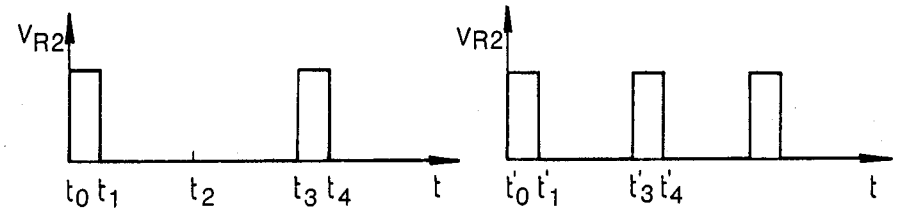

The operation of the device of the present invention will be described below in which reference will also be made of FIG. 2.

This operation, as will be described in detail, is based on the experimentally confirmed supposition that the more the surface of the glass is wetted the more easily the blades slide over it and the more frequent must be the operation of the windscreen wiper to obtain a sufficient visibility. The degree of slidability of the surface which is representative of the quantity of water present on the windscreen, is proportional to the force required of the motor to drive the windscreen wiper, and the current passing through the motor. The detection, by means of the simple resistor 19 in series with the motor 3, of the current, provides a measure of the force of the motor 3, on the basis of which the device 1 controls a suitable delay between one operation and the next of the blade on the glass. The greater the force of the motor 3 the longer will be the pause between the various actuations. The double switch 2 in the position illustrated in FIG. 1, that is to say with connections to the contacts $D_0$ and $D_0'$ is in the stop condition of the motor 3. By displacing the double switch 2 into the contact position with the contacts $D_1$ and $D_1'$, the motor 3 is activated with operation determined by the above described device of the present invention. Initially one has in fact a condition of activation by the transistor 53 and of supply by the winding 58 of the relay 59 by which the switch 62 is closed. Moreover, by way of the contact $D_1$, the input terminal 11 of the motor 3 is directly supplied with the power that controls the movement of the blades of the windscreen wiper. The armature current passing through the motor 3 is thus proportional to the force applied, and supposing that the surface of the windscreen is lightly wetted, for example in conditions of intermittent rainfall, the signal $V_i$ from the unit 21 is directly proportional to the armature current of the motor 3, and is illustrated in the left part of FIG. 2(a). This signal $V_i$ has an initial peak of the order of 10–12 Ampere which corresponds to the current utilized by the short circuit and which does not vary with the sliding conditions on the windscreen. The force required by the motor 3 which we are here interested to quantify is that which corresponds to the subsequent operating section. The signal $V_i$ is conveniently filtered in the circuit 22 and amplified in the unit 26, and determines the output signal $V_1$ illustrated in FIG. 2(b), which signal is proportional to the difference between the signals $V_i$ and $V_0$, in which the signal $V_0$ constitutes a subtractive part in order better to discriminate the force conditions connected with the movement of the blades on the windscreen. The constant of proportionality K can be chosen in such a way that by doubling the force, for example, that is the signal $V_i$, the signal $V_1$ becomes n times greater. From experimental tests it has been determined that as the surface of the windscreen passes from very wet to dry the force varies in the ratio of about 1 to 2. On the other hand, since a delay time of the variable motor 3 from 0 to about 8–10 minutes at the most is desired, it becomes necessary to increase the variation of the force, which has been achieved precisely by generating the signal $V_1$. This signal $V_1$ is supplied to the integrator circuit 36 which provides at its output the signal $V_2$ indicated in FIG. 2(c). It is to be noted that as soon as the motor 3 starts to turn (instant $t_0$) the positive voltage applied to the input terminal 11 through the closed switch 62 via the switch 13 connected to the contact 16 determines the voltage signal $V_{R2}$ indicated in FIG. 2(f), which is applied to the inverting input of the differential amplifier 66 and lasts for the time $t_0$–$t_1$, during which the cam 14 maintains the switch 13 in contact with the contact 16. It is further to be noted that in these operating conditions of the motor 3 the switch 63 is open. From the differential amplifier 66 there is therefore provided a zeroing signal for the integrator circuit 36, so that a first decreasing phase from $t_0$ to $t_1$ of the signal $V_2$ occurs. Subsequently the switch 13 transfers the connection from the contact 16 to the contact 15 so that the signal $V_{R2}$ is no longer present, and therefore the signal $V_2$ at the output of the integrator circuit 36 can start to rise as a proportional function of the signal $V_1$. This signal will rise more rapidly when the force required by the motor 3 is greater. The signal $V_2$ is continuously compared with the reference threshold signal $V_s$ in the comparator unit 48, and when this voltage $V_2$ exceeds the voltage $V_s$ the signal $V_3$ (FIG. 2(d)) at the output of the comparator unit 48 becomes zero so that the transistor 53 is switched off and the relay 59 is deactivated. The switch 62 also opens so that this supply route to the terminal 11 of the motor 3 is open and the motor continues therefore to be supplied until the termination of the wiping cycle, by means of the contact 15 of the switch 13. The voltage $V_2$ therefore still continues to increase. When the blade gets close to returning to its rest position the cam 14 changes the connection of the switch 13 from the contact 15 to the contact 16 so that the supply of positive voltage to the terminal 11 is interrupted by grounding terminal 11 through the now closed switch 63 and through the connection to the ground of the contact $D_1'$, in such a way as to form the typical "return-to-zero" circuit of the windscreen wiper with drastic braking of the motor 3. In this state (instant $t_2$) the signals $V_i$ and $V_1$ therefore are nullified and the signal $V_2$ begins to decrease. The time interval $t_2$–$t_3$, during which the motor 3 remains stationary until the signal $V_2$ decreases to the value $V_s$, increases proportionately when the value of the signal $V_i$, and therefore of the current in the motor 3, was greater due to the increased force required during the activation time. The delay $t_2$–$t_3$ will therefore be longer when the surface of the windscreen has become drier. At the instant $t_3$, when the signal $V_2$ falls below the threshold signal $V_s$, the signal $V_3$ at the output of the comparator unit 48 appears again to renew the cycle of activation of the motor 3 as already described. The time interval $t_3$–$t_4$ is that corresponding to the connection of the switch 13 with the contact 16. It must be noted that at each appearance of the signal $V_3$ at the output of the comparator unit 48 the signal $V_{R1}$ (FIG. 2(e)) causes a pulse for discharging the integrator circuit 36.

We suppose now that starting from the situation described, the force of the motor 3 gradually reduces as the windscreen wiper becomes ever wetter. The signals $V_i$ and $V_1$ also reduce as does the signal $V_2$ so that the delay time $t_2$–$t_3$ reduces. Finally, (right hand part of FIG. 2) if the signals $V_i$ and $V_1$ are so low that the signal $V_2$ does not succeed in reaching the threshold signal $V_s$, the signal $V_3$ at the output of the comparator unit 48 is constant and the device passes into the condition of continuous operation in which the relay 59 is always activated. In this case the zeroing signal $V_{R1}$ disappears and only the zeroing signal $V_{R2}$ is present.

The double switch 2, when it is in the connection condition with the contacts $D_2$ and $D_2'$ or $D_3$ and $D_3'$, controls the motor 3 to operate continuously at reduced speed and normal speed respectively in a known manner, and, also in a known manner, determines the stopping of the motor 3 in the connection conditions with the contacts $D_0$ and $D_0'$.

The unit 77 of FIG. 1 has been inserted to improve the operation of the system both upon the initial actuation of the switch 2 and subsequently to improve its sensitivity to the changing conditions of wetness which can occur during operation. The circuit 77 is in fact supplied by means of the signal $V_3$ (FIG. 2(d)) and provides the amplifier 25 of FIG. 1 with the filtered value of the signal $V_3$, a small portion of which is added to the force-representative signal provided by the unit 22 of FIG. 1.

Each time that the device is operated, because of the delay introduced by the filtering unit 77, an initial continuous operation of several strokes occurs, which is advantageous to clear the windscreen. Because of the continuous operation, however, the signal $V_3$ is always active, making the signal at the output of the unit 77 increase and increasingly reinforcing the force representative signal $V_i$, to the extent that there is a minimum intermittence such as to bring the signal $V_3$ to zero. The magnitude of the output signal from the unit 77 is such as to bring the system, after a certain time, to an intermittent operation as soon as this is incipient, with the result that it is always ready to operate intermittently.

The advantages of the device for automatically adjusting the frequency of activation of a motor vehicle windscreen wiper, formed according to the present invention, are apparent from what has been described in that the driver no longer has to intervene in dependence on variable visibility conditions through the windscreen, but simply with the connection of the contacts $D_1$ and $D_1'$ obtains an automatic adjustment of the delay time which can pass, automatically, as required, to continous operation.

Finally, it is clear that the described embodiments of the device of the present invention can be modified and varied without departing from the scope of the invention itself. For example, the device described can be applied both to a front screen wiper, with single or dual speed continuous operation, and also to a rear window wiper, even without connections for continuous operation.

I claim:

1. An electronic circuit for automatic adjustment of the frequency of activation of an intermittent motor vehicle windscreen wiper based upon the quantity of moisture on the windscreen, comprising:

a wiper motor;

means for detecting the variance in current passing through said motor wherein said means generates a proportional voltage signal ($V_i$);

means for filtering and amplifying said voltage signal ($V_i$) generated by said detecting means wherein said filtering and amplifying means generates a filtered voltage signal ($V_2$);

means for generating a threshold voltage signal ($V_s$);

means for comparing said voltage signal ($V_2$) derived from said detecting means with said threshold signal ($V_s$) wherein said comparing means generates a control signal ($V_3$);

means for controlling the power supplied to said motor responsive to said control signal wherein said controlling means simultaneously controls a first direct supply circuit for said motor and a second circuit forming a short circuit connection to said motor;

means for overriding the intermittent activation of the wiper wherein said overriding means provides continuous operation for at least two wiping cycles upon initial activation of the circuit whereby said means generates a voltage signal which is added to said signal derived from said detecting means; and switch means for controlling the activation of the circuit.

2. The electronic circuit as defined in claim 1 further comprising a voltage stabilizer unit responsive to said switch means wherein said stabilizer unit generates a voltage signal utilized by said filtering and amplifying means.

3. The electronic circuit as defined in claim 1 wherein said detecting means includes a potentiometer for adjustment of said voltage signal proportional to said current.

4. The electronic circuit as defined in claim 1 wherein said comparing means compares said voltage signal $V_2$ with said threshold voltage signal $V_s$ and generates said control signal $V_3$ whereby said control signal $V_3$ determines the frequency of activation of the windscreen wiper.

5. The electronic circuit as defined in claim 1 wherein said comparing means comprises a differential amplifier.

6. The electronic circuit as defined in claim 1 wherein said means for controlling the power supplied to said motor comprises a relay, at least two switches and a switching circuit comprising a transistor.

7. The electronic circuit as defined in claim 1 wherein said filter and amplifying means generates an output voltage signal $V_1$, according to the equation $V_1 = K(V_i - V_0)$ wherein K is an amplification constant and $V_0$ is a constant voltage signal.

8. The electronic circuit as defined in claim 1 wherein said means for generating said threshold voltage signal comprises an integrator circuit, the load on said integrator circuit responsive to said voltage signal $V_i$ generated by said detecting means and wherein said integrator circuit discharges in response to control signal $V_3$ generated by said comparing means.

9. The electronic circuit as defined in claim 8 wherein said integrator circuit also discharges at each operating cycle of said motor.

10. The electronic circuit as defined in claim 9 wherein said integrator circuit has different charging and discharging time constants.

11. The electronic circuit as defined in claim 1 further comprising means for continuous operation of the windscreen wiper.

12. The electronic circuit as defined in claim 1 wherein said means for filtering and amplifying said voltage signal ($V_i$) comprises means for generating an amplified and filtered voltage ($V_1$) and means for integrating said amplified and filtered voltage ($V_1$) to generate the voltage signal ($V_2$).

* * * * *

UNITED STATES PATENT AND TRADEMARK OFFICE
CERTIFICATE OF CORRECTION

PATENT NO. : 4,499,410

DATED : February 12, 1985

INVENTOR(S) : Stefano Iacoponi & Vittorio Di Nunzio

It is certified that error appears in the above—identified patent and that said Letters Patent is hereby corrected as shown below:

Column 3, line 50 delete "latter".

Column 5, line 4 delete "that is".

Signed and Sealed this

Second Day of July 1985

[SEAL]

Attest:

DONALD J. QUIGG

Attesting Officer     Acting Commissioner of Patents and Trademarks